US 12,085,719 B2

(12) United States Patent
Aiello

(10) Patent No.: US 12,085,719 B2
(45) Date of Patent: Sep. 10, 2024

(54) HEAD MOUNTED DEVICE WITH TERAHERTZ TRACKING

(71) Applicant: Meta Platforms Technologies, LLC, Menlo Park, CA (US)

(72) Inventor: Gaetano Aiello, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/205,357

(22) Filed: Jun. 2, 2023

(65) Prior Publication Data

US 2024/0201496 A1 Jun. 20, 2024

Related U.S. Application Data

(60) Provisional application No. 63/432,555, filed on Dec. 14, 2022.

(51) Int. Cl.
*G02B 27/01* (2006.01)
*G01S 13/89* (2006.01)
*G06F 3/01* (2006.01)

(52) U.S. Cl.
CPC .......... *G02B 27/0172* (2013.01); *G01S 13/89* (2013.01); *G06F 3/013* (2013.01); *G02B 2027/0138* (2013.01); *G02B 2027/014* (2013.01); *G02B 2027/0178* (2013.01)

(58) Field of Classification Search
CPC .......... G01S 13/89; G06F 3/013; G06F 3/015
See application file for complete search history.

(56) References Cited

U.S. PATENT DOCUMENTS

| 9,552,062 B2 | 1/2017 | Gohl |
| 10,437,329 B2 | 10/2019 | Konstantatos et al. |
| 11,217,235 B1 | 1/2022 | Chu et al. |

FOREIGN PATENT DOCUMENTS

DE 102017112536 A1 12/2018

OTHER PUBLICATIONS

Phillips D. B., et al., "Adaptive Foveated Single-Pixel Imaging with Dynamic Supersampling," Science Advances, Apr. 21, 2017, vol. 3, No. 4, 11 pages.

*Primary Examiner* — Sardis F Azongha
(74) *Attorney, Agent, or Firm* — Freestone Intellectual Property Law PLLC; Aaron J. Visbeek

(57) ABSTRACT

Terahertz sensing in this disclosure involves the use of at least one terahertz signal that is transmitted towards an object. At least one return terahertz signal is reflected from the object. The return terahertz signal(s) may be analyzed to determine one or more parameters, such as phase, frequency, amplitude, spectral profile, time of flight (TOF) etc. associated with the return terahertz signal(s). Based on the parameter(s), a portion of the object impinged upon by the transmit terahertz signal(s) and which reflected the return terahertz signal(s), and the state of the object/portion, can be identified. The identification of the portion and its state can be used in eye tracking implementations.

20 Claims, 7 Drawing Sheets

HEAD MOUNTED DEVICE WITH TERAHERTZ TRACKING

CROSS-REFERENCE TO RELATED APPLICATIONS

This application is a non-provisional application that claims priority under 35 U.S.C. § 119(e) to U.S. Provisional Patent Application No. 63/432,555 filed Dec. 14, 2022, which is hereby incorporated by reference.

TECHNICAL FIELD

This disclosure relates generally to sensing, and in particular but not exclusively, relates to terahertz sensing, including tracking using terahertz signals.

BACKGROUND INFORMATION

Smart devices may include one or more electronic components for use in a variety of applications, such as gaming, aviation, engineering, medicine, entertainment, video/audio chat, activity tracking, and so on. Some smart devices, such as head mounted devices such as head mounted displays (HMDs), may perform eye-tracking which may enhance the user's experience. For example, it may be advantageous for an HMD to determine the location of the eyes of the user and/or to determine where the eyes of the user are focusing, so as to alter the content being presented to the user by the HMD.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1A:
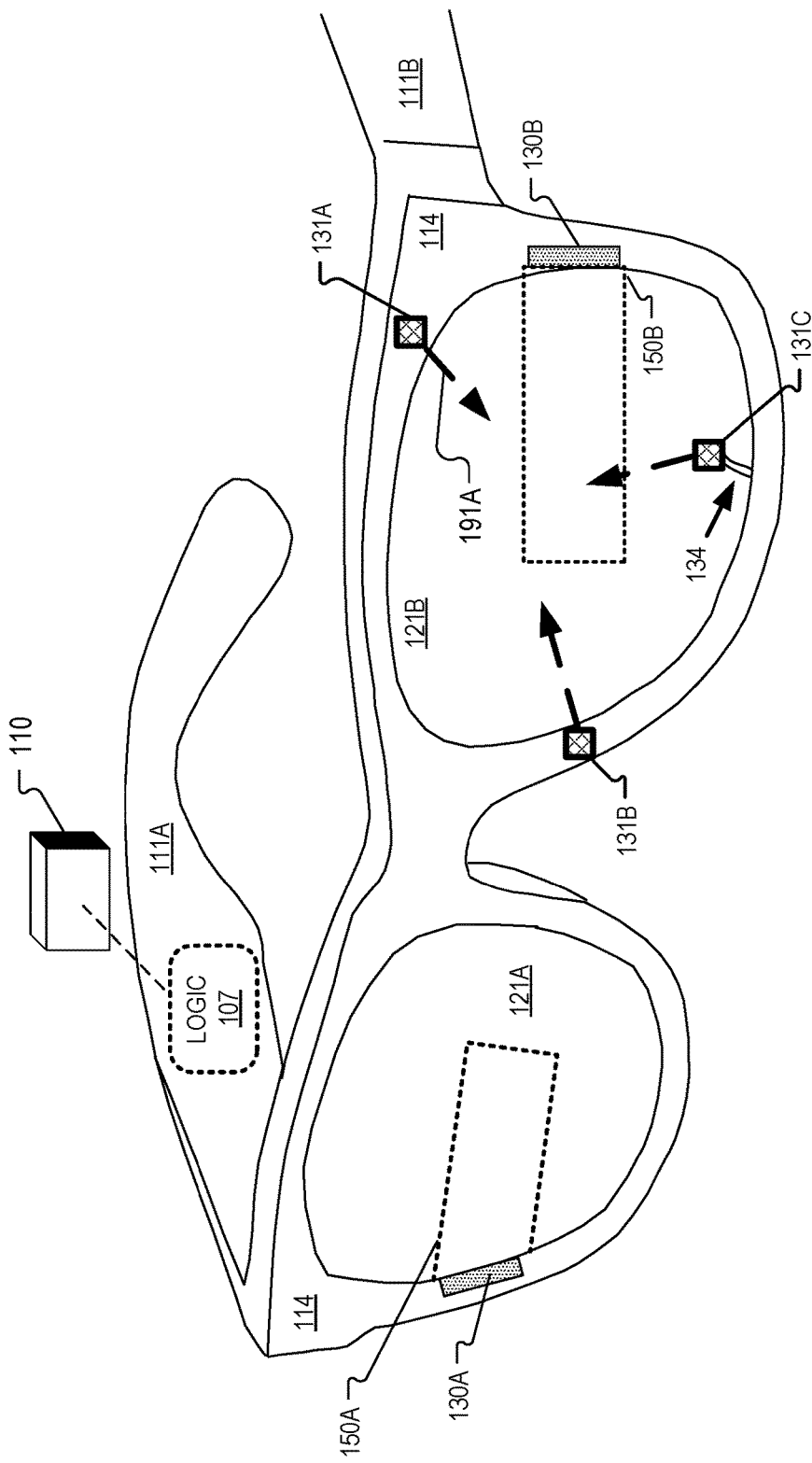
FIG. 1A illustrates a head mounted device that may include a near-eye system with terahertz sensing capability, in accordance with aspects of the disclosure.

Embodiments of sensing (including tracking) using terahertz signals are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

An apparatus/device, system, and method for terahertz sensing that are described in this disclosure involve the use of at least one transmit terahertz signal (e.g., a beam in the terahertz frequency band) that is transmitted towards an object. At least one return terahertz signal is reflected from the object. The return terahertz signal(s) may be analyzed to determine one or more parameters, such as phase, frequency, amplitude, spectral profile, time of flight (TOF) etc. associated with the return terahertz signal(s). Based on the parameter(s), a portion of the object impinged upon by the transmit terahertz signal(s) and which reflected the return terahertz signal(s) can be identified. The identified portion may include a portion of an eye or skin, and the identification of the portion of the object from the parameters associated with the return terahertz signal(s) also enable determination of a state of the portion of the object, such as a gaze direction of the eye, whether the eye is closed (e.g., covered by the eyelid/skin), etc. for eye tracking and/or other purposes. TOF analysis, spectral analysis, machine learning techniques, and/or other techniques may be used to determine/identify the portion of the eye or other object and its state from the return terahertz signal(s).

For the purposes of example and illustration, some embodiments will be described hereinafter in the context of a head mounted device, such as a head mounted display (HMD). It is understood that HMDs are just one example of a device that can implement the terahertz sensing features and capabilities described herein—other types of devices (head mounted or otherwise) may implement the terahertz sensing features described here.

Furthermore, and also for the purposes of example and illustration, some embodiments will be described hereinafter in the context of implementing terahertz sensing for eye tracking purposes. Again, such implementation is just one example in connection with the terahertz sensing capabilities and features described herein. The terahertz sensing capabilities and features described herein can be used in other implementations, such as facial recognition, medical diagnosis or treatment, or other applications that may not necessarily involve eye tracking.

The use of terahertz signals for sensing provides advantages and benefits, such as the capability of terahertz signals to penetrate beneath skin level and higher resolution provided by large bandwidths of terahertz signals having short wavelengths. Embodiments for terahertz sensing methods/devices that provide these and other advantages/benefits are described in more detail in connection with FIGS. 1-7.

An example is now described in the context of using terahertz sensing for a head mounted device. For example, FIG. 1A illustrates a head mounted display (HMD) 100 that may include a near-eye system with terahertz sensing capability, in accordance with aspects of the present disclosure. The HMD 100 includes a frame 114 coupled to arms 111A and 111B. Lens assemblies 121A and 121B are mounted to the frame 114. The lens assemblies 121A and 121B may include a prescription lens matched to a particular user of the HMD 100. The illustrated HMD 100 is configured to be worn on or about a head of a wearer/user of the HMD 100.

In the HMD 100 illustrated in FIG. 1A, each lens assembly 121A/121B includes a display waveguide 150A/150B to direct image light generated by displays 130A/130B to an eyebox region for viewing by a user of the HMD 100. The displays 130A/130B may include a beam-scanning display that includes a scanning mirror, for example. While the HMD 100 is illustrated as a head mounted display, implementations of the disclosure may also be utilized on head mounted devices (e.g., smartglasses) that do not necessarily include a display.

The lens assemblies 121A and 121B may appear transparent to a user to facilitate augmented reality or mixed reality to enable a user to view scene light from the environment around them while also receiving image light directed to their eye(s) by, for example, by the waveguides 150. The lens assemblies 121A and 121B may include two or more optical layers for different functionalities such as display, eye-tracking, and optical power. In some embodiments, image light from the display 130A or 130B is only directed into one eye of the wearer of the HMD 100. In an embodiment, both displays 130A and 130B are used to direct image light into the waveguides 150A and 150B, respectively.

The frame 114 and arms 111 may include supporting hardware of the HMD 100 such as processing logic 107 that may include or be coupled to related wired and/or wireless data interface for sending and receiving data, graphic processors, and one or more memories for storing data and computer-executable instructions. The processing logic 107 may include circuitry, logic, a machine-readable storage medium that stores instructions, ASIC circuitry, FPGA circuitry, and/or one or more processors. At least some of components of the processing logic 107 may be included amongst the components of a processing system 110 in some embodiments. Components of the processing system 110 may be located on the HMD 100 and/or remotely from the HMD 100. According to various embodiments that will be described later below, the processing system 110 may be configured to process information associated with terahertz signals, for purposes of performing operations pertaining to eye tracking as an example.

In one embodiment, the HMD 100 may be configured to receive wired power. In one embodiment, the HMD 100 is configured to be powered by one or more batteries. In one embodiment, the HMD 100 may be configured to receive wired data including video data via a wired communication channel. In one embodiment, the HMD 100 is configured to receive wireless data including video data via a wireless communication channel.

FIG. 1A illustrates example terahertz modules 131A, 131B, and 131C (collectively referred to as terahertz module(s) 131) that are disposed in different positions on the HMD 100. Each of the terahertz modules 131 may operate as a terahertz sensor in some embodiments. In different implementations, more or fewer terahertz modules 131 may be implemented in a head mounted device. The terahertz module 131A generates a transmit terahertz signal 191A (e.g., a terahertz beam) directed to an eyebox region that an eye of a wearer of HMD 100 will occupy, and also receives a return terahertz signal 192A (shown in FIG. 1B) from the eyebox. The terahertz module 131B and terahertz module 131C may also generate respective transmit terahertz signals (collectively referred to herein as transmit terahertz signal(s) 191 or more simply as terahertz signal(s) 191) directed to the eyebox region that an eye of a wearer of the HMD 100 will occupy, and may also receive return terahertz signals (collectively referred to herein as return terahertz signal(s) 192).

The terahertz modules 131A and 131B in the example of FIG. 1A are disposed on or in the frame 114 of the HMD 100. In some embodiments, the terahertz module 131C may be disposed in or on the lens assembly 121B, such as depicted in FIG. 1A, so as to be positioned in a field of view (FOV) of the user.

According to some embodiments, the terahertz modules 131 may be implemented using solid state technology or other technology that provides a small form factor and/or transparency when advantageous. For the purposes of explanation and illustration in this disclosure, the terahertz modules 131 are described herein in the context of being terahertz transceiver (TX/RX) devices that have both transmission and reception capabilities. It is understood that such are only examples—in other embodiments, at least some of the terahertz modules 131 can be implemented as separate discrete terahertz transmitters or discrete terahertz receivers that operate as terahertz sensors.

In some embodiments, there may be multiple terahertz modules 131 that are each configured to output a terahertz signal 191 (e.g., a terahertz beam) that sweeps across or otherwise encompasses a respective specific portion of an eyebox region and/or a particular region outside of the eyebox region. These portions of the eyebox region (and/or other region) may have some overlap, such that a first portion of the eyebox region (which is swept/encompassed by the terahertz signal 191A from the terahertz module 131A) may overlap at least in part with a second portion of the eyebox region (which is swept/encompassed by the terahertz signal 191B from the terahertz module 131B), for example. In some embodiments, a single terahertz signal 191 from a single terahertz module 131 may sweep/encompass the entirety of the eyebox region, alternatively or additionally to using an array of multiple terahertz modules 131.

The processing logic 107 is illustrated in FIG. 1A as being included in the arm 111A of the HMD 100, although the processing logic 107 may be disposed at other locations of the frame 114 or the arms 111 of the HMD 100. The processing logic 107 may configured to operate one or more of the terahertz modules 131 to direct terahertz signals 191 to the eyebox region. The processing logic 107 may be coupled to drive each terahertz module 131 by way of traces/conductors 134. With respect to the terahertz module 131C disposed in the field of view (FOV) of the user, the traces/conductors 134 may be transparent, semi-transparent, or opaque. The traces 134 may include indium tin oxide (ITO) or copper, for example.

According to various embodiments, the processing logic 107 may be configured to generate one or more signals to operate the terahertz modules 131, such as control signals that control the frequency, phase, transmit direction, steering speed (e.g., raster/scan/sweep speed), power or amplitude level, waveform shape (e.g., square pulse waveform, sinusoidal waveform, other continuous or non-continuous waveform, etc.), beam width (e.g., narrow beam, wide beam, etc.), or other operational aspect or parameter of the terahertz modules 131 and/or of the terahertz signals 191 that are output from the terahertz modules 131.

The processing logic 107 may also be configured to process the return terahertz signals 192. The processing logic 107 may work independently of or, in cooperation with, the processing system 110 to perform various operations related to the transmit terahertz signals 191 and the return terahertz signals 192, including processing the return terahertz signals 192 for purpose of eye tracking and/or other functions pertaining to identifying an object and determining the position or other state of the object (e.g., the user's eye or skin).

Figure 1B:
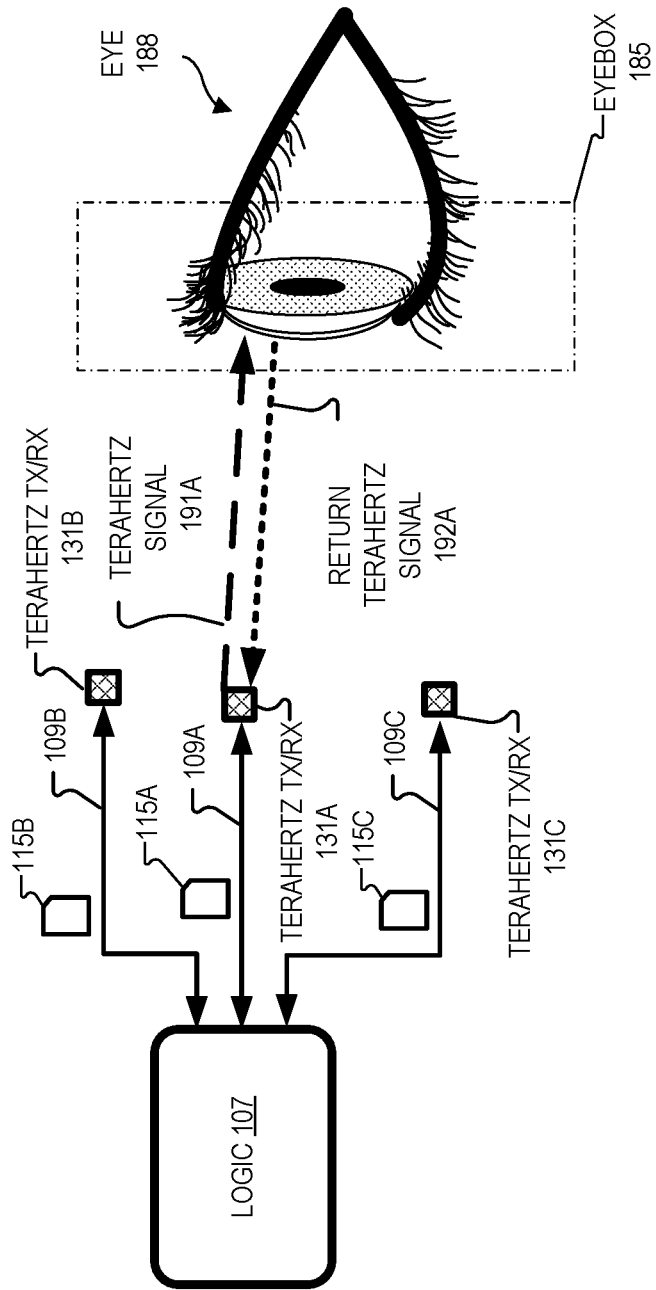
FIG. 1B illustrates further details of the operation of terahertz modules, in accordance with aspects of the disclosure.

FIG. 1B illustrates further details of the operation of the terahertz modules 131, in accordance with aspects of the disclosure. The processing logic 107, which may include driving logic to drive/control the terahertz modules 131, generates a signal 115A that is sent to the terahertz module 131A by way of a communication channel 109A. The processing logic 107 also sends signals 115B and 115C to respective terahertz modules 131B and 131C by way of corresponding communication channels 109B and 109C. The communication channels 109 may include one or more conductors and/or may be wireless channels. The terahertz modules 131A-131C are configured to generate corresponding terahertz beams (e.g., the terahertz signals 191A-191C) directed to an eye 188 that occupies an eyebox region 185.

The terahertz modules 131A-131C are further configured to receive corresponding return terahertz signals 192 that are reflected from the eyebox region 185 (and/or reflected from skin within or outside of the eyebox region 185). For example, the terahertz module 131A of FIG. 1B is shown as receiving the return terahertz signal 192A from the eye 188.

It is to be appreciated that there need not necessarily be a one-to-one relationship between a particular terahertz module 131 and its corresponding return terahertz signal 192A. For example, the terahertz module 131A may receive other return terahertz signals (e.g. the return terahertz signals 192B and/or 192C), alternatively or in addition to receiving its respective return terahertz signal 192A.

Figure 2:
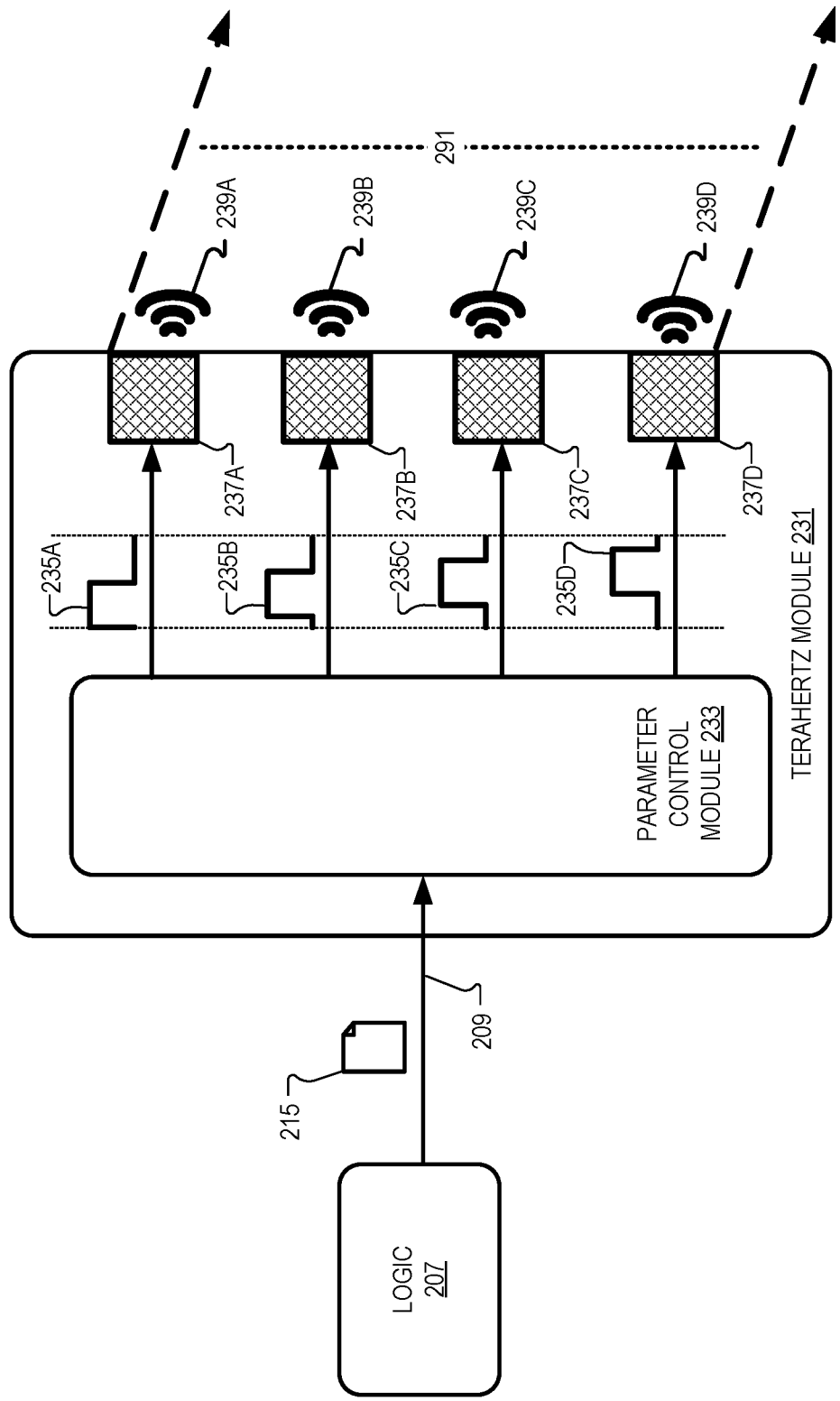
FIG. 2 illustrates an example terahertz module that includes a parameter control module and an array of terahertz signal generators, in accordance with aspects of the disclosure.

FIG. 2 illustrates an example terahertz module 231 that includes a parameter control module 233 and an array of terahertz signal generators 237A-237D (collectively referred to herein as the terahertz signal generator(s) 237), in accordance with aspects of the disclosure. The terahertz module 131 may include the features of the terahertz module 231.

FIG. 2 illustrates four terahertz signal generators 237A-237D, although different numbers of terahertz signal generators may be included in the terahertz module 231. For example, the terahertz module 231 may include one, eight, twelve, sixteen, etc. terahertz signal generators 237.

According to various embodiments that will be described hereinafter as an example, the terahertz signal generators 237 may each have the capability to perform both the generation and the transmission of terahertz signals. In other embodiments, transmission components may be provided separately from the terahertz signal generators 237, such that these transmission components transmit the terahertz signals generated by the terahertz signal generators 237. For the sake of simplicity of explanation and illustration, receiver components (e.g., the receiver functionality of terahertz sensors) in the terahertz module 231 are not shown in FIG. 2, with respect to embodiments in which the terahertz module 231 includes the combined functionality of a transceiver that performs both transmitting and receiving.

In some implementations, the terahertz signal generators 237 may include and/or may be embodied as laser diodes or other laser-related devices, transducers, oscillators, antennas, graphene-based devices, microelectromechanical system (MEMS) devices, waveguides, mirrors, various types of solid state devices (e.g., silicon-based devices), steering structures, or any other small form factor components/techniques capable to generate and output terahertz signals (e.g., terahertz beams). Such components may be mechanical, electrical, optical, magnetic, and/or chemical in structure and operation. Analogous components can be provided for the receiver functionality of the terahertz module 231.

A parameter control module 233 receives a signal 215 from the processing logic 207 (e.g., from driving logic of the processing logic 207) by way of a communication channel 209. The processing logic 207 and signal 215 may correspond to or be the same as the processing logic 107 and signal 115 of FIGS. 1A and 1B.

In response to the signal 215, the parameter control module 233 of various embodiments is configured to control the terahertz signal generators 237, so as to set or change a parameter of the terahertz signal generators 237 and/or of a terahertz signal respectively generated and transmitted by each of the terahertz signal generators 237. For example and as previously explained above, these parameters may include one or more of: a frequency, phase, transmit direction, steering speed (e.g., raster/scan/sweep speed, or stationary corresponding to a speed of zero), power or amplitude level, waveform shape, beam width, etc.

In the example depicted in FIG. 2, the parameter control module 233 is driving each of the terahertz signal generators 237A-237D with respective phase-differentiated drive signals 235A-235D. For instance, the phase-differentiated drive signals 235 vary in phase (e.g., are time delayed) with respect to each other or with respect to at least one of the other phase-differentiated drive signals.

The terahertz signal generator 237A generates an individual terahertz signal 239A in response to the phase-differentiated drive signal 235A; the terahertz signal generator 237B generates an individual terahertz signal 239B in response to the phase-differentiated drive signal 235B; the terahertz signal generator 237C generates an individual terahertz signal 239C in response to the phase-differentiated drive signal 235C; and the terahertz signal generator 237D generates an individual terahertz signal 239D in response to the phase-differentiated drive signal 235D. The constructive and destructive interference of the individual terahertz signals 239A, 239B, 239C, and 239D combine to form a transmit terahertz signal 291 in FIG. 2 (e.g., the transmit terahertz signal 191A in FIGS. 1A and 1B). In FIG. 2, the phase-differentiated drive signals 235A-235D may have waveforms in the shape of rectangular pulse train, and the resulting transmit terahertz signal 291 may also have a waveform in the shape of a rectangular pulse train, as an example.

According to various embodiments, one or more of the terahertz modules 231 may be provided for the HMD 100. The transmit terahertz signal 291 (e.g., a terahertz beam) from each respective terahertz module 231 may have some different and/or same parameters relative to each other, such as phase, frequency, amplitude, transmit direction, waveform shape, beam width, scan/sweep speed and direction (including a speed of zero for stationary beams), etc. In embodiments that provide only a single terahertz module 231, the transmit terahertz signal 291 may be fixed on the eyebox 185 and/or on region(s) outside of the eyebox 185 such as with a wide beam width, or may be swept over the eyebox 185 and/or the other regions with a relatively narrower beam width.

Figure 3:
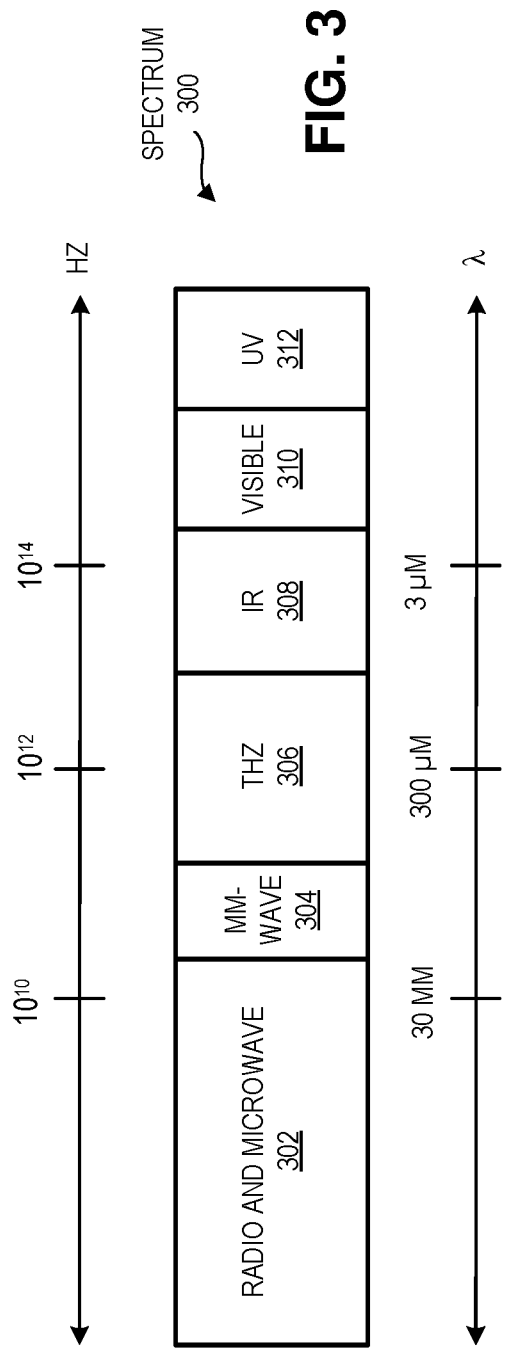
FIG. 3 illustrates an electromagnetic spectrum having a terahertz band, in accordance with aspects of the disclosure.

FIG. 3 illustrates an electromagnetic spectrum 300 (not drawn to scale) having a terahertz band 306, in accordance with aspects of the disclosure. The spectrum 300 includes a radio and microwave band 300, a mm-band 304, the terahertz band 306, an IR band 308, a visible light band 310, and a UV band 312.

The terahertz band 306 may range between frequencies of about 100 GHz (about 3 mm wavelength) to 10 THz (about 30 μm wavelength). The transmit terahertz signals 191/291 and the return terahertz signals 192 may have frequencies within the terahertz band 306.

Figure 4:
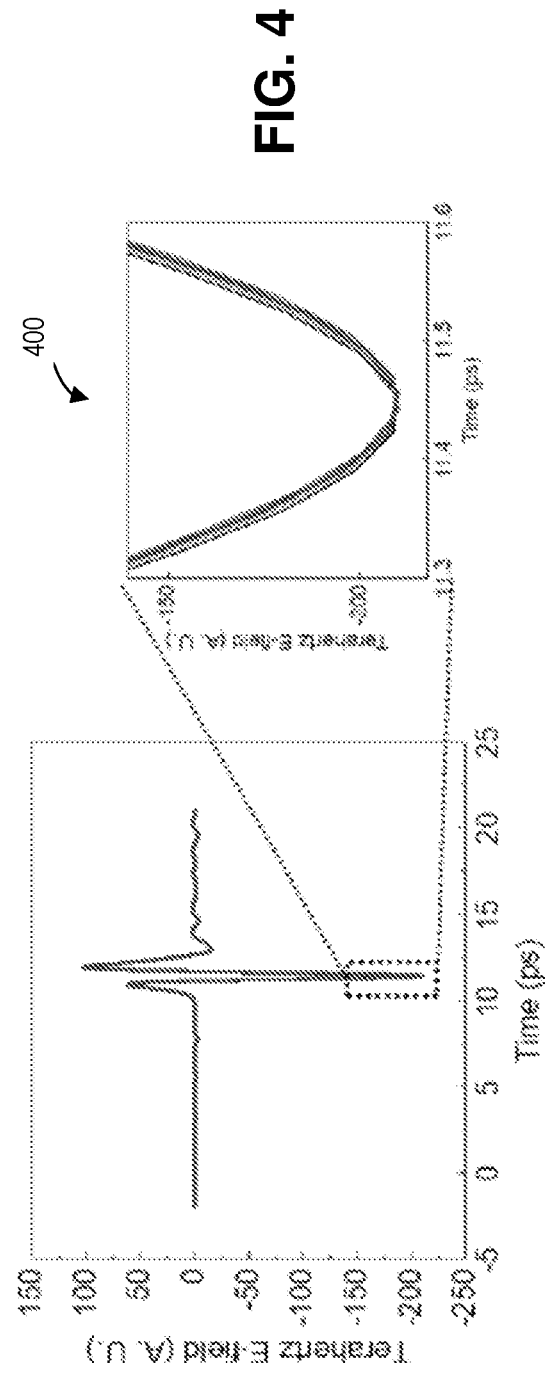
FIG. 4 illustrates an example pulse of a terahertz signal, in accordance with aspects of the disclosure.

FIG. 4 illustrates an example pulse 400 of a terahertz signal (e.g., the transmit terahertz signal 191/291), in accordance with aspects of the disclosure. The example pulse(s) 400 may be a short pulse, for instance about 0.3 ps in duration or other relatively smaller wavelength as depicted in FIG. 4, and corresponds to a large bandwidth. The large bandwidth enables higher/better resolution for eye tracking or other imaging applications. In one example implementation for purposes of illustration, a single pulse 400 can be transmitted every 10 ns or other time interval.

Figure 5:
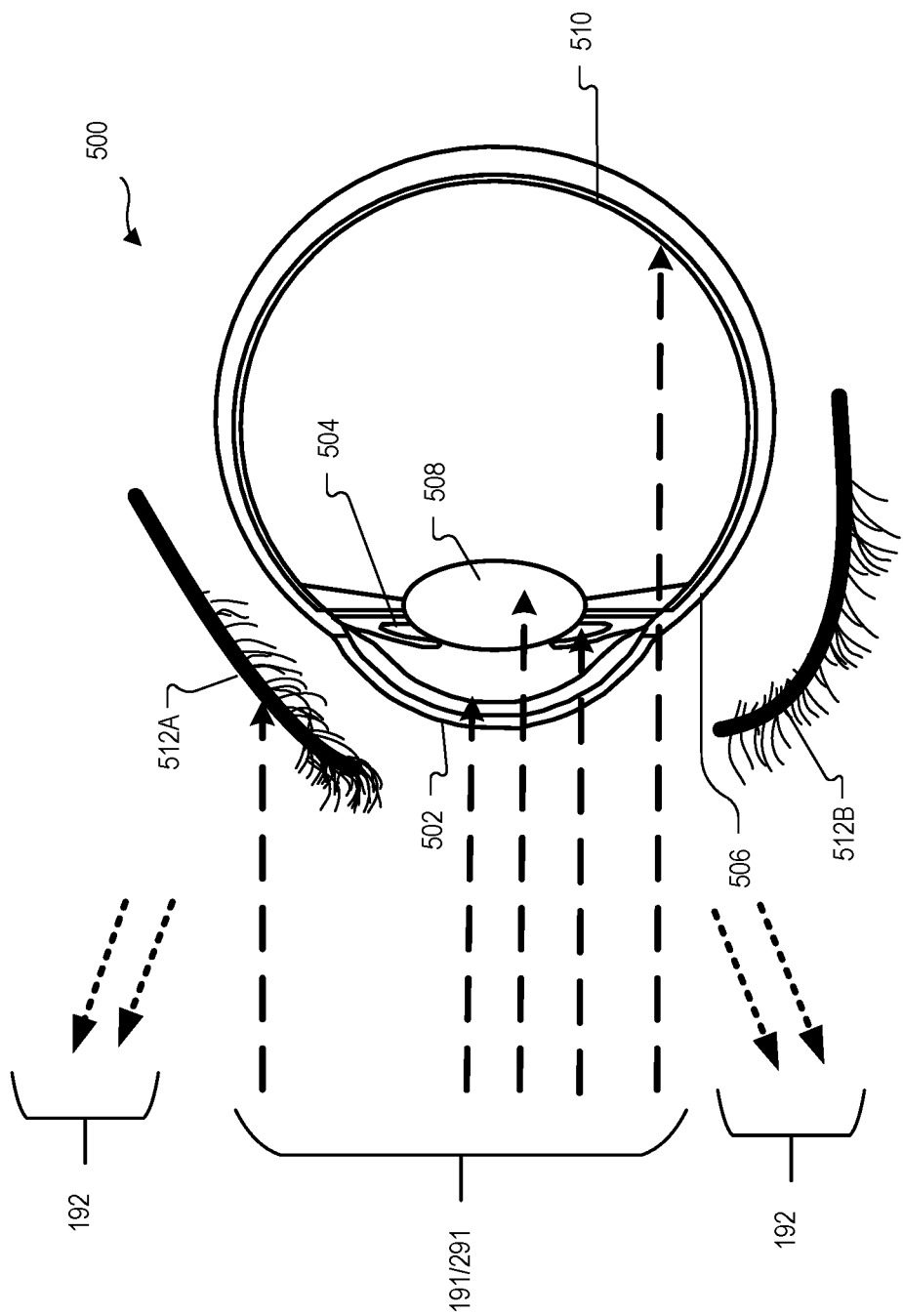
FIG. 5 illustrates terahertz signals impinging on an eye, in accordance with aspects of the disclosure.

FIG. 5 illustrates terahertz signals impinging on an object such as an eye 500 (e.g., the eye 188 of FIG. 1B) as an example, in accordance with aspects of the disclosure. Some of the parts/portions of the eye 500 and structures/regions outside of the eye 500 may include: a cornea 502, an iris 504, a scelera 506, a lens 508, a retina 510, and eyelashes and eyelid/skin 512A and 512B (including other areas outside of the eye 500 such as the forehead, checks, mouth, lips, teeth, hair, etc.).

As shown by example in FIG. 5, one or more of the transmit terahertz signals 191/291 may impinge on the eye 500 and on the regions that lie outside of the eye 500 (e.g., the eyelashes and eyelid/skin 512A and 512B), and may penetrate to some depth so as to reach portions of the eye 500 beneath/behind the cornea 502 and the sclera 506. In some implementations, the transmit terahertz signals 191/291 may penetrate the eye 500 at a depth sufficient to reach the retina 510 and other rear-ward portions of the eye 500.

One or more of the return terahertz signals 192 may be reflected from the eye 500 and/or from other regions having terahertz signals 191/291 impinged thereon. A time between transmission of transmit terahertz signal(s) 191/291 and the reception of the return terahertz signal(s) 192 may be deemed to be a time of flight (TOF) in some embodiments.

According to some embodiments, the return terahertz signal(s) 192 may have one or more parameters (e.g., characteristics) that are the same as or that differ from parameters of the corresponding transmit terahertz signal(s) 191/291. For example, the return terahertz signal(s) 192 may differ in one or more of: phase, amplitude, waveform shape, propagation path, frequency components, TOF, etc., relative to the corresponding transmit terahertz signal(s) 191/291 and also relative to other ones of the return terahertz signals 192. Such parameter(s) and difference(s) thereof may be caused by and indicative of the particular portions of the eye 500 and other regions that the transmit terahertz signals 191/291 impinged upon and/or penetrated. Hence, such parameters may be used for imaging the eye 500 and other regions, or for otherwise determining a location or other state of the eye 500 and the other regions, for eye tracking purposes or other uses. Operations pertaining to processing the return terahertz signals 192 for these purposes will be described next below.

Figure 6:
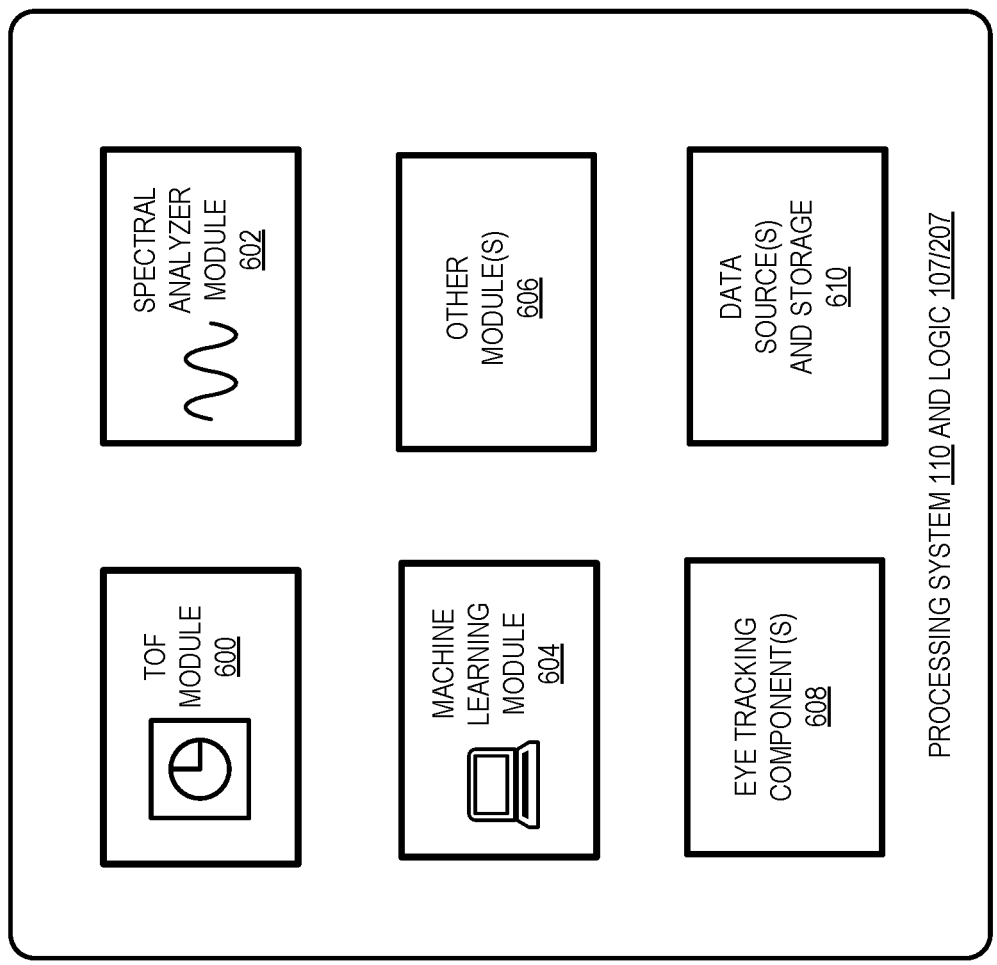
FIG. 6 illustrates a processing system, in accordance with aspects of the disclosure.

FIG. 6 illustrates a processing system, in accordance with aspects of the disclosure, specifically further details of the processing system 110 (which may include the logic 107). According to various embodiments, the processing system 110 may include a plurality of modules, such as a TOF module 600, a spectral analysis module 602, a machine learning module 604, and/or other module(s) 606. The processing system 110 may also include eye tracking component(s) 608 (which form part of an eye tracking system) to perform eye tracking operations and/or other processing operations pertaining to terahertz signals, in cooperation with the modules 600-606. The processing system 110 may further include data source(s) and data storage 610 for data used by or generated by the modules 600-606 and the eye tracking component(s) 608. Eye tracking will be used as an example herein to describe FIG. 6. It is appreciated that the terahertz signal-based sensing and processing operations described herein may be applied to other applications that may not necessarily be related to eye tracking, including facial expression tracking, health diagnosis, etc.

In operation, the processing system 110 receives the return terahertz signals 192 that are reflected from the eye 188/500 and other regions. From parameters/characteristics of the return terahertz signals 192, the processing system 110 can determine various pieces of information/states regarding the eye 188/500 and other regions, including a position (e.g., gaze direction) of the pupil, depth of portions of the eye 188/500, whether the eye 188/500 is closed by the eyelids 512A/512B, etc.

For example, the TOF module 600 may be configured to determine the TOF with respect to certain portions of the eye 188/500 and adjacent structures. Such various portions and adjacent structures may correspond to different TOFs. For instance, the eyelid 512A/512B may correspond to a different TOF as compared to the scelera 506 or retina 510, since the eyelid 512A/512B may be closer in distance to the terahertz module(s) 231 as compared to exterior/interior portions of the eye 188/500. From the TOFs determined by the TOF module 600 and based on historical or other reference TOF data that may be stored in the data storage 610, the eye tracking component(s) 608 may be able to extrapolate or otherwise identify the portions of the eye 188/500 and adjacent areas being impinged upon by the terahertz signals 191/291 and also the positions or other states of the eye 188/500 and adjacent areas.

In some situations, a single pulse of a transmit terahertz signal 191/291 may yield multiple reflections (e.g., multiple return terahertz signals 192) when impinging upon the same or multiple object(s). These multiple return terahertz signals 192 may possibly also vary relative to each other in terms of return path, TOF, frequency, amplitude, etc. According to some embodiments, the TOF module 600 and/or the eye tracking component(s) 608 may perform an operation, such as averaging, to obtain a result that is representative of the multiple return terahertz signals 192, if appropriate. In a situation when a single pulse of a transmit terahertz signal 191/291 yields multiple reflections from multiple objects, the object corresponding to the shortest TOF amongst the multiple reflections can be deemed by the eye tracking component(s) 608 to be the closest object. Various methods for segregating or combining multiple TOFs (and/or other parameters) for identification, efficiency, accuracy, etc. purposes (such as for building the structure and determining the position of the eye 188/400 and adjacent regions) can be implemented in the embodiments.

With respect to the spectral analyzer module 602, the spectral analyzer module 602 of some embodiments can operate based on a general principle that different materials will yield varying parameters (characteristics) in their return terahertz signals 192 (e.g., different spectral responses/profiles). For example, the skin of the eyelid 512A/512B may have a different spectral response than the iris 504. Among other things, the difference(s) in spectral responses may be embodied as or otherwise indicated through differences in frequency, amplitude, phase, waveform shape, etc. between multiple return terahertz signals 192. Frequency components in the spectral responses may lie within and/or outside of the terahertz frequency band 306 in some situations.

The spectral analyzer module 602 may be configured to generate (or otherwise obtain, determine, or process) the spectral information of the return terahertz signals 192. From the spectral information provided by the spectral analyzer module 602 and based on historical or other reference spectral information that may be stored in the data storage 610, the eye tracking component(s) 608 may be able to extrapolate or otherwise identify the portions of the eye 188/500 and adjacent areas being impinged upon by the terahertz signals 191/291 and also the positions or other states of the eye 188/500 and adjacent areas.

With respect to the machine learning module 604, the machine learning module 604 may be used to perform reconstruction or other identification of the eye 188/500 and adjacent areas using machine learning (ML) datasets, alternatively or in addition to the algorithmic approaches described above with respect to the TOF module 600 and the spectral analyzer module 602. For example, the machine learning module 604 may provide a training function, in which the machine learning module 604 builds the ML datasets as the user wears and operates the HMD 100. The ML datasets may include data corresponding to return terahertz signals 192 that are generated during the course of the training. The ML datasets may be stored in the data storage 610.

The data in the ML dataset may correspond to, for example, signals associated with gaze position, eye parts/portions and their position, eyelids or skin, etc. and may also correspond to time-domain and/or frequency-domain characteristics of the signals, wherein such data in the ML dataset is built and refined over time. During real-time eye tracking operations (and/or other operations), the machine learning module 604 may then analyze the return terahertz signal(s) 192 so as to associate the return terahertz signal(s) 192 with one or more particular signals (or related data) in the ML dataset. Based on this association, the eye tracking component(s) 608 may be able to extrapolate or otherwise identify the portions of the eye 188/500 and adjacent areas being impinged upon by the terahertz signals 191/291 and also the positions or other states of the eye 188/500 and adjacent areas.

The other module(s) 606 can perform operations alternatively or in addition to those performed by modules 600-604. The other module(s) 606 may also perform some of the operations described above with respect to the modules 604-606, including TOF, waveform analysis in the time and frequency domains, ML-related operations, etc. The various modules 600-606 (as well as the eye tracking components 608) may be combined together into one or more common modules in some embodiments. In some embodiments, an eye tracking system that uses non-visible light (e.g., IR light) to identify a position of an eye can be used in conjunction with the terahertz-related components described above. Such eye tracking system using non-visible light can be used to supplement the eye tracking operations performed by the terahertz-related components, or as a backup system.

Figure 7:
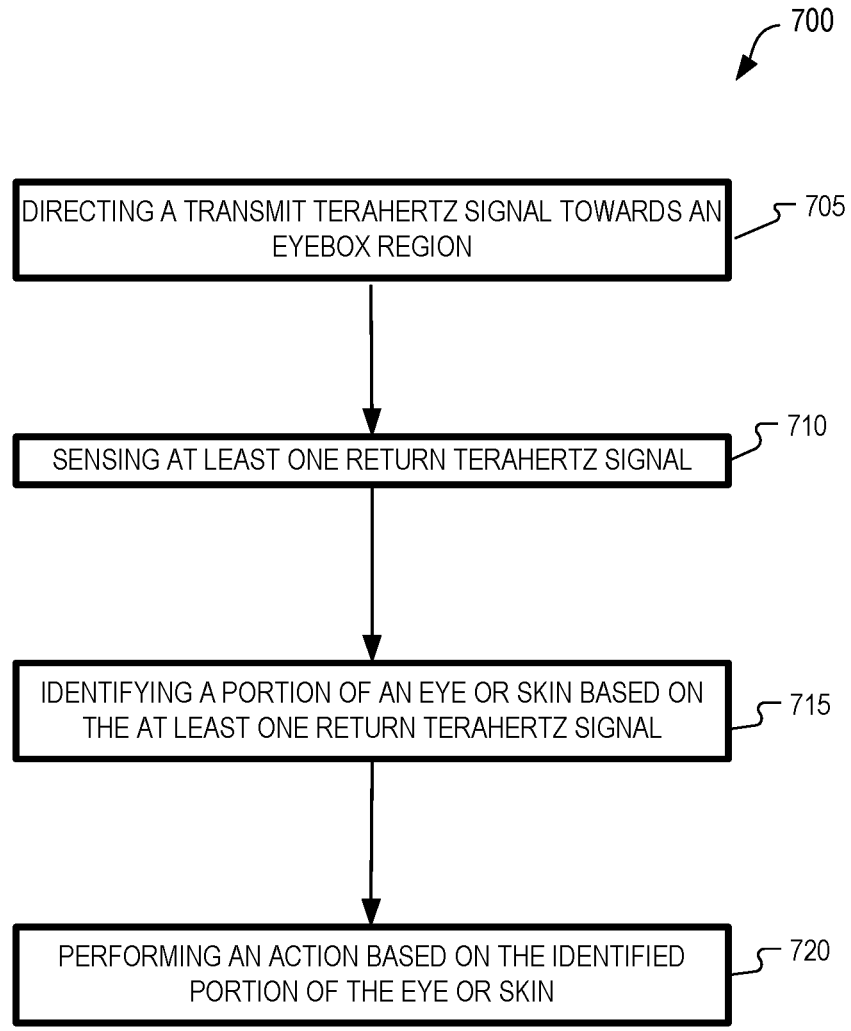
FIG. 7 is a flowchart illustrating a method for tracking using terahertz signals, in accordance with aspects of the disclosure.

FIG. 7 is a flowchart illustrating a method 700 for tracking using terahertz signals, in accordance with aspects of the disclosure. The various operations in the process blocks of the method 700 may be performed by the processing system 110, alone or in cooperation with other components (including the terahertz modules 131/231) of a head mounted device such as the HMD 100.

The order in which some or all of the process blocks appear in the method 700 should not be deemed limiting. Rather, one of ordinary skill in the art having the benefit of the present disclosure will understand that some of the process blocks may be executed in a variety of orders not illustrated, or even in parallel. Furthermore, some process blocks may be removed, added, combined, supplemented with additional process blocks, etc.

In a process block 705, the processing system 110 generates and sends the signal 115/215 to the terahertz module(s) 131/231. In response to the signal 115/215, the parameter control module 233 controls the terahertz signal generators 237, so as to set or change a parameter of the terahertz signal generators 237 and/or of a terahertz signal respectively generated and transmitted by each of the terahertz signal generators 237. As previously described above, such parameters may include phase, frequency, amplitude, transmit path, sweep/scan speed, etc. The resulting terahertz signals 191/291 are then transmitted so as to impinge on the eyebox 185 and/or other regions outside of the eyebox 185.

In a process a block 710, the processing system 110 senses (such as via receiver components of the terahertz module(s) 131/231) at least one return terahertz signal 192 that has been reflected from the eyebox 185 and/or adjacent regions (such as skin of the eyelids, forehead, cheeks, etc.).

In a process block 715, the processing system 110 processes the at least one return terahertz signal 192, so as to identify a portion of an eye or skin. For example, based on the at least one return terahertz signal 192, the processing system 110 can identify a pupil, eyelid, other eye parts/portions, etc., including their states such as eyes closed, gaze direction, etc. The processing system 110 may use the modules 600-606 in combination with other components of the processing system 110 to perform this identification.

In a process block 720, the processing system 110 may perform an action based on the identified portion of the eye or skin. As an example, if the eye's gaze direction has been determined at the process block 715, an adjustment of the display 130A/130B may be performed so that the location and/or presentation of displayed images more closely correspond to the gaze direction. Other actions that enhance/improve/adjust operational features of the HMD 100, such as operational features that are dependent at least in part on the gaze direction and that involve tracking, may be performed at the process block 720.

Embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. logic 107/207) in this disclosure may include one or more processors, microprocessors, multi-core processors, Application-specific integrated circuits (ASIC), and/or field programmable gate arrays (FPGAs) to execute operations disclosed herein. In some embodiments, memories are integrated into the processing logic to store instructions to execute operations and/or store data. Processing logic may also include analog or digital circuitry to perform the operations in accordance with embodiments of the disclosure.

A "memory" or "memories" (e.g., the data storage 610) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels (e.g., the communication channels 109/209) may include or be routed through one or more wired or wireless communication utilizing IEEE 802.11 protocols, short-range wireless protocols, serial peripheral interface (SPI), inter-integrated circuit (I2C), universal serial Bus (USB), controller area network (CAN), cellular data protocols (e.g., 3G, 4G, LTE, 5G, etc.), optical communication networks, Internet service providers (ISPs), a peer-to-peer network, a local area network (LAN), a wide area network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (e.g., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments, including what is described in the Abstract, is not intended to be exhaustive or to be limited to the precise forms disclosed. While specific embodiments are described herein for illustrative purposes, various modifications are possible within the scope of the disclosure, as those of ordinary skill in the relevant art having the benefit of this disclosure will recognize.

These modifications can be made in light of the above detailed description. The terms used in the following claims should not be construed to be limited to the specific embodiments disclosed in the specification. Rather, the scope of the invention is to be determined entirely by the following claims, which are to be construed in accordance with established doctrines of claim interpretation.

What is claimed is:

1. A head mounted device, comprising:
a terahertz sensor configured to:
direct a transmit terahertz signal towards an eyebox region; and
sense at least one return terahertz signal, wherein the at least one return terahertz signal is reflected from the eyebox region in response to the transmit terahertz signal; and
processing logic coupled to the terahertz sensor and configured to identify, based on the at least one return terahertz signal sensed by the terahertz sensor, a portion of an object in the eyebox region.

2. The head mounted device of claim 1, wherein the portion of the object includes a portion of an eye or skin, and wherein identification of the portion includes determination of a state of the eye or object, including a gaze direction of the eye.

3. The head mounted device of claim 1, wherein to identify the portion of the object in the eyebox region based on the at least one return terahertz signal, the processing logic is configured to:
determine a time of flight (TOF) based on a time between the transmit terahertz signal being directed towards the eyebox region and the at least one return terahertz signal being received by the terahertz sensor; and
identify the portion of the object including a state of the portion of the object based at least in part on the TOF.

4. The head mounted device of claim 1, wherein to identify the portion of the object in the eyebox region based on the at least one return terahertz signal, the processing logic is configured to:
perform spectral analysis on the at least one return terahertz signal to determine a spectral profile of the portion of the object; and
identify the portion of the object including a state of the portion of the object based at least in part on the spectral profile.

5. The head mounted device of claim 1, wherein to identify the portion of the object in the eyebox region based on the at least one return terahertz signal, the processing logic is configured to:
analyze the at least one return terahertz signal to associate the return terahertz signal with a particular signal in a machine learning (ML) dataset; and
identify the portion of the object including a state of the portion of the object based at least in part on the associated particular signal.

6. The head mounted device of claim 1, wherein to identify the portion of the object in the eyebox region based on the at least one return terahertz signal, the processing logic is configured to:
determine a parameter associated with the at least one return terahertz signal, wherein the parameter includes one or more of: a frequency, phase, amplitude, spectral profile, propagation path, time of flight (TOF), waveform shape, or beam width associated with the at least one return terahertz signal; and
use the determined parameter to identify the portion of the object including a state of the portion of the object.

7. The head mounted device of claim 1, wherein:
the transmit terahertz signal impinges on a particular region outside of the eyebox region,
the at least one return terahertz signal includes a particular return terahertz signal reflected from the particular region, and
the processing logic is further configured to identify the particular region based on the particular return terahertz signal.

8. A method for a head mounted device to perform tracking using terahertz signals, the method comprising:
directing a transmit terahertz signal towards an eyebox region; and
sensing at least one return terahertz signal, wherein the at least one return terahertz signal is reflected from the eyebox region in response to the transmit terahertz signal;
identifying, based on the at least one return terahertz signal, a portion of an object in the eyebox region; and
performing an action pertaining to an operational feature of the head mounted device based on the identified portion of the object in the eyebox region.

9. The method of claim 8, wherein the portion of the object includes a portion of an eye or skin, and wherein identification of the portion includes determination of a state of the eye or object, including a gaze direction of the eye.

10. The method of claim 8, wherein identifying the portion of the object in the eyebox region based on the at least one return terahertz signal includes:
determining a time of flight (TOF) based on a time between the transmit terahertz signal being directed towards the eyebox region and the at least one return terahertz signal being received by a terahertz sensor; and
identifying the portion of the object including a state of the portion of the object based at least in part on the TOF.

11. The method of claim 8, wherein identifying the portion of the object in the eyebox region based on the at least one return terahertz signal includes:
performing spectral analysis on the at least one return terahertz signal to determine a spectral profile of the portion of the object; and
identifying the portion of the object including a state of the portion of the object based at least in part on the spectral profile.

12. The method of claim 8, wherein identifying the portion of the object in the eyebox region based on the at least one return terahertz signal includes:
analyzing the at least one return terahertz signal to associate the return terahertz signal with a particular signal in a machine learning (ML) dataset; and
identifying the portion of the object including a state of the portion of the object based at least in part on the associated particular signal.

13. The method of claim 8, wherein identifying the portion of the object in the eyebox region based on the at least one return terahertz signal includes:
determining a parameter associated with the at least one return terahertz signal, wherein the parameter includes one or more of: a frequency, phase, amplitude, spectral profile, propagation path, time of flight (TOF), waveform shape, or beam width associated with the at least one return terahertz signal; and
using the determined parameter to identify the portion of the object including a state of the portion of the object.

14. The method of claim 8, wherein:
the transmit terahertz signal impinges on a particular region outside of the eyebox region,
the at least one return terahertz signal includes a particular return terahertz signal reflected from the particular region, and
the method further includes identifying the particular region based on the particular return terahertz signal.

15. The method of claim 8, wherein performing the action pertaining to the operational feature of the head mounted device includes making an adjustment to a display of the head mounted device that presents an image to the eyebox.

16. A device, comprising: a terahertz transmitter configured to direct a transmit terahertz signal towards an object; a terahertz receiver configured to receive at least one return terahertz signal, wherein the at least one return terahertz signal is reflected from the object in response to the transmit terahertz signal; and a processing system coupled to the terahertz transmitter and to the terahertz receiver, and configured to identify, based on the at least one return terahertz signal sensed by the terahertz receiver, a portion of the object and a state of the portion of the object.

17. The device of claim 16, wherein to identify the portion of the object and the state of the portion of the object, the processing system is configured to:
determine a time of flight (TOF) based on a time between the transmit terahertz signal being directed towards the object by the terahertz transmitter and the at least one return terahertz signal being received by the terahertz receiver; and
identify the portion of the object and the state of the portion of the object based at least in part on the TOF.

18. The device of claim 16, wherein to identify the portion of the object and the state of the portion of the object, the processing system is configured to:

perform spectral analysis on the at least one return terahertz signal to determine a spectral profile of the portion of the object; and identify the portion of the object and the state of the portion of the object based at least in part on the spectral profile.

19. The device of claim 16, wherein to identify the portion of the object and the state of the portion of the object, the processing system is configured to:

analyze the at least one return terahertz signal to associate the return terahertz signal with a particular signal in a machine learning (ML) dataset; and identify the portion of the object and the state of the portion of the object based at least in part on the associated particular signal.

20. The device of claim 16, wherein the device is a head mounted device that uses the terahertz transmitter, the terahertz receiver, and the processing system for eye tracking.

* * * * *